United States Patent [19]

Manfredi et al.

[11] Patent Number: 5,009,374
[45] Date of Patent: Apr. 23, 1991

[54] AIRCRAFT WITH RELEASABLE WINGS

[76] Inventors: Carl Manfredi, 5 Virginia Rd., Bellerose Village, N.Y. 11001; Antonina Manfredi, 45-38 48 St., Woodside, Queens, N.Y.; Dario P. Manfredi, 16 Stubbe Dr., Stony Point, N.Y. 10980; Savia Giarraffa, 70 Sanford Dr., Randolph, N.J. 07869

[21] Appl. No.: 186,151

[22] Filed: Apr. 26, 1988

[51] Int. Cl.$^5$ .................... B64C 1/32
[52] U.S. Cl. .................... 244/1 R; 89/1.14; 102/378; 244/139; 244/120
[58] Field of Search ........... 244/1 R, 139, 140, 141, 244/121, 120, 123, 124, 3.25, 129.1, 17.11; 102/377, 378, 369; 219/70, 65; 428/649; 89/1.14; 148/9 C; 431/99

[56] References Cited

U.S. PATENT DOCUMENTS

| | | | |
|---|---|---|---|
| 2,665,093 | 1/1954 | Manfredi et al. | 244/139 |
| 2,666,656 | 1/1954 | Bruning | 244/129.1 |
| 2,937,824 | 5/1960 | Krumbholz et al. | 244/3.25 |
| 2,973,164 | 2/1961 | Grill | 244/1 R |
| 3,319,520 | 5/1967 | Stefano et al. | 102/378 |
| 3,352,513 | 11/1967 | Baker et al. | 244/140 |
| 4,143,841 | 3/1979 | Roeder | 244/140 |
| 4,306,693 | 12/1981 | Cooper | 244/140 |
| 4,660,807 | 4/1987 | Campana | 219/70 |

Primary Examiner—Galen Barefoot

[57] ABSTRACT

This invention relates to aircraft and specifically to devices for disconnecting the winds in a rapid manner. The frame of the wings is atached to the frame of the fuselage with exploding bolts. The skin of the wings is secured to the skin of the fuselage with rivets that also explode or a burnable tape is placed under the skin to sever the skin. A control arrangement is provided that simultaneously ignites the exploding bolts and the rivets or the tape to disconnect the wings from the fuselage.

9 Claims, 4 Drawing Sheets

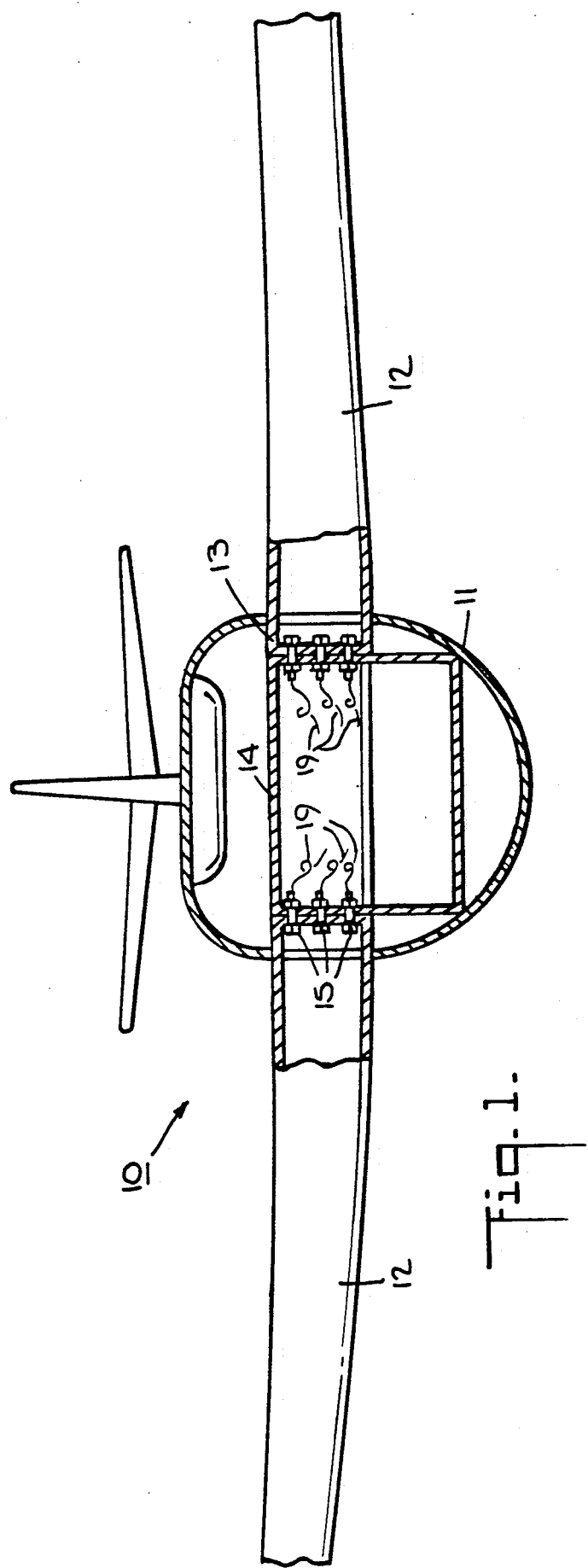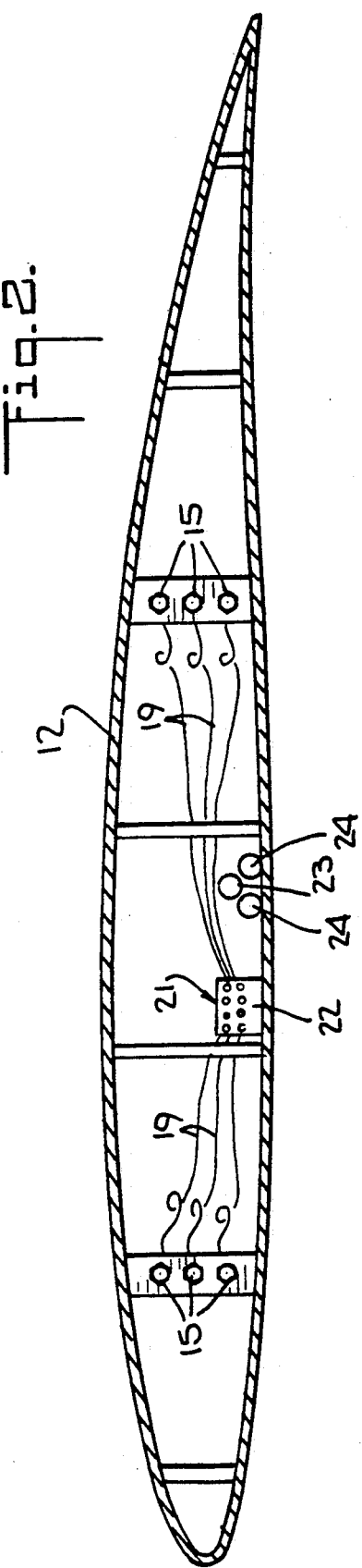

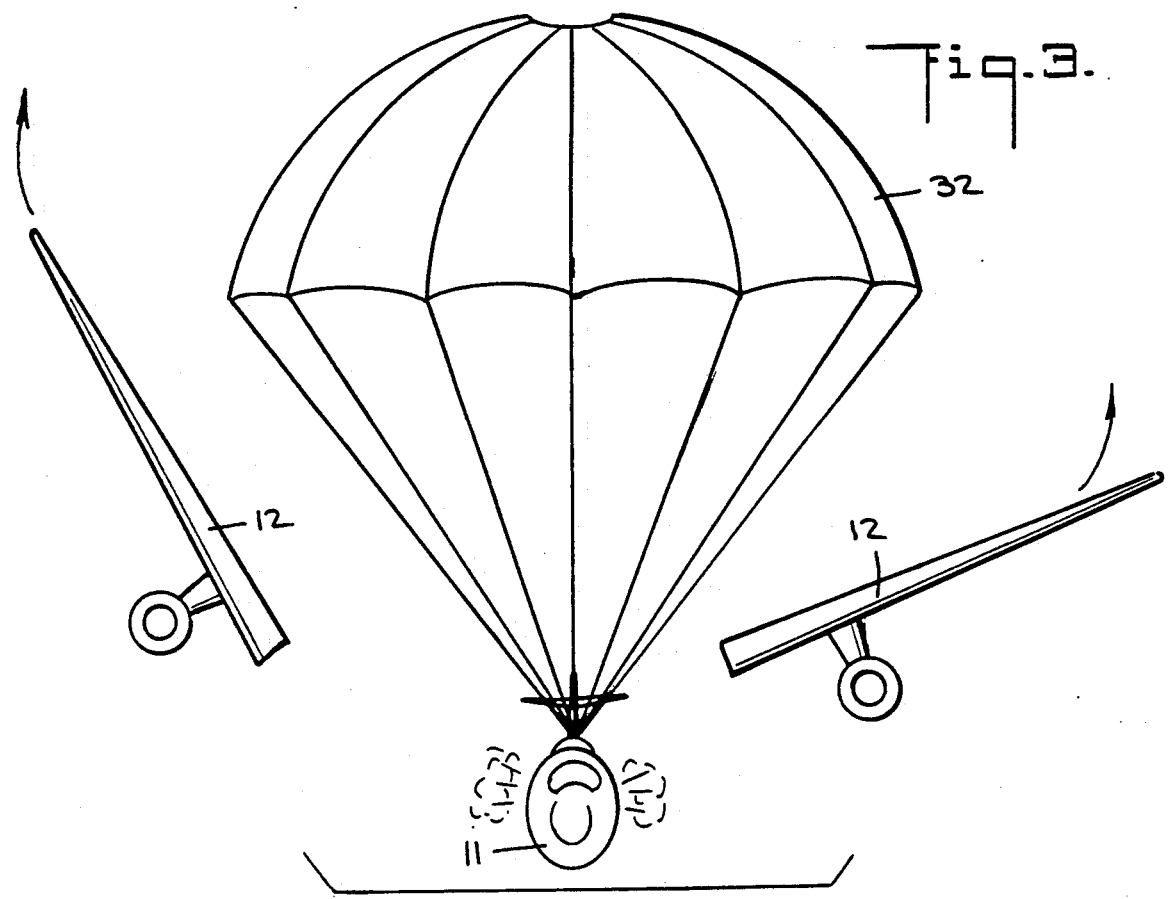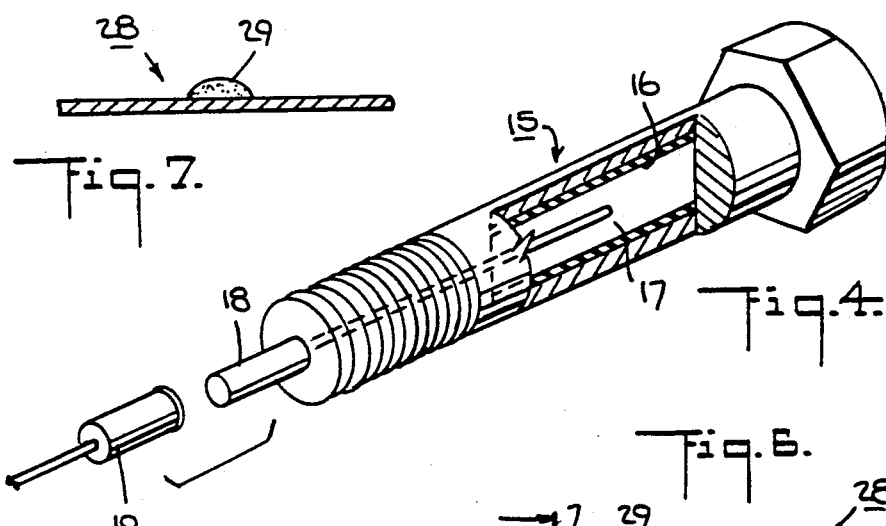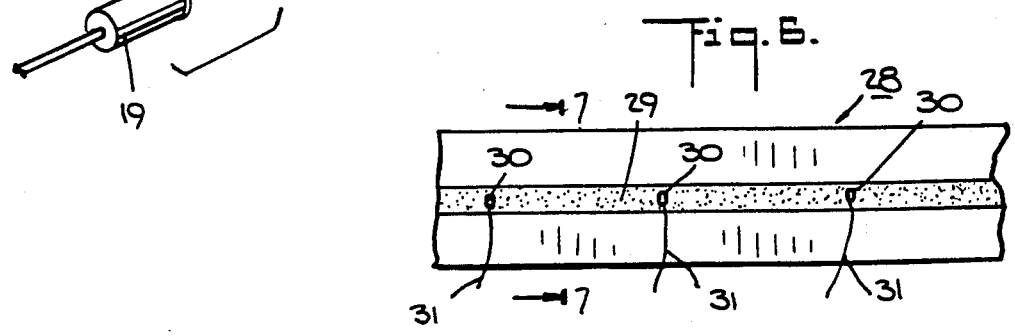

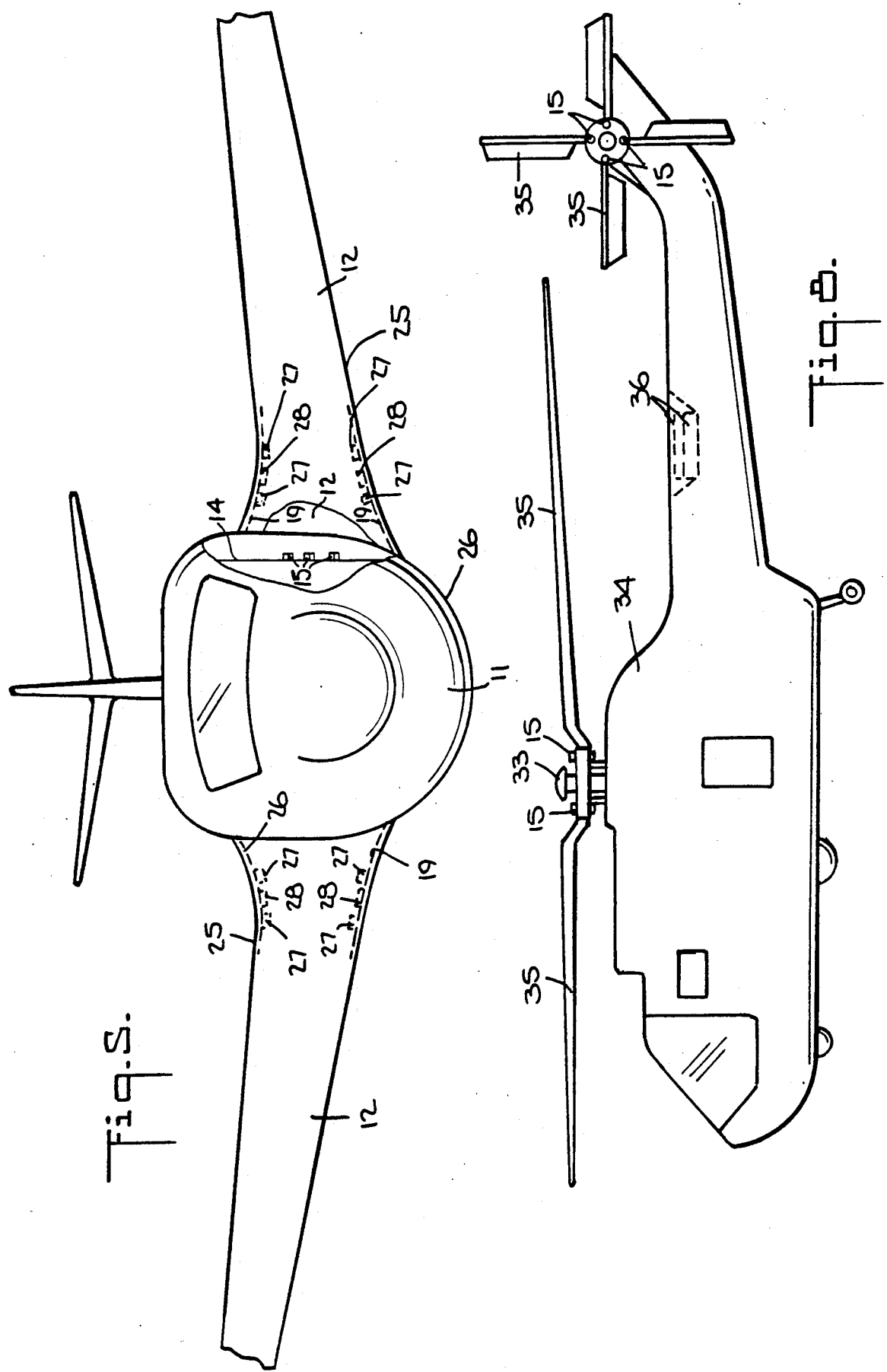

AIRCRAFT WITH RELEASABLE WINGS

This invention relates to an aircraft with releasable wings. Heretofore, various proposals have been made for improving the safety features of aircraft construction. For example, U.S. Pat. No. 3,160,374 describes a system whereby an aircraft which is in distress can deploy a parachute to aid in the landing of the craft as well as an ejection means for releasing the fuel containing wings of the aircraft to further aid in the landing of the craft by the parachute. As described, the ejection means includes a release unit for releasing wing pins which secure the wings to the fuselage of the aircraft to permit the wings to fall away from the fuselage The release unit, however, is of relatively cumbersome structure and includes a toggle connection and tiller elements which must be actuated in order to bring about release of the pins.

U.S. Pat. No. 3,437,285 describes another form of a wing-release means which employs rotary locking members as well as rockets which can be exploded for pushing the wings away from a craft upon release. However, such wing-release means are relatively cumbersome and require rather complex mechanical mechanisms for actuation. In addition, such mechanisms require maintenance to ensure that all parts remain in working order should the need ever arise.

Accordingly, it is an object of the invention to simplify the detachment of the wings of an aircraft for an emergency landing procedure.

It is another object of the invention to provide a wing release system for an aircraft which has a rapid response time.

It is another object of the invention to provide a relatively simple means for severing a wing from an aircraft.

It is another object of the invention to improve the safety of an aircraft.

Briefly, the invention provides an aircraft having a fuselage and a pair of wings which extend from opposite sides of the fuselage with means for separating the wings from the fuselage.

In one embodiment, the means for separating the wings from the fuselage employs a plurality of explodable bolts which secure each wing to the fuselage and means for exploding the bolts to allow the wings to disconnect from the fuselage. In this embodiment, the means for exploding the bolts includes an electrical system having an electronic breadboard mounted in at least one of the wings and which is electrically connected to the bolts to electrically activate the bolts. In addition, a switch for activating the system is provided in the fuselage and is electrically connected to the breadboard for actuating the breadboard to explode the bolts.

In another embodiment, a burnable tape is secured to an inner circumferential periphery of the skin of each wing adjacent the fuselage and a means is provided for ignition of the tape to sever the wing from the fuselage. In this embodiment, the tape includes a longitudinally disposed strip of burnable powder, such as magnesium, and a plurality of spark igniters spaced along and within the strip for ignition of the powder. Each igniter is also electrically connected to the means for igniting the tape which, in turn, includes a switch and breadboard arrangement as in the first embodiment.

In still another embodiment, a plurality of explodable rivets may secure the outer skin of a wing to the fuselage. In this case, these rivets are connected to the means used to activate the exploding bolts so that the rivets explode simultaneously with the bolts.

In each embodiment, the wings of the aircraft may include fuel tanks, fuel lines, hydraulic lines, and the like. In these cases, quick-disconnect means may be employed to connect the hydraulic and fuel lines in the wings to the lines in the fuselage at the points where the wings are attached to the fuselage. Thus, when the wings are separated from the fuselage, the disconnect means permits a ready and automatic disconnection of the lines from each other. By mounting within the wing, the breadboard and the connections thereto may also be separated from the fuselage as an unnecessary weight.

In each embodiment, the aircraft may also be provided, as is known, with at least one parachute which is connected to the fuselage and disposed in a collapsed condition, for example, in a suitable hatch or compartment. In addition, means are provided for deploying the parachute after separation of the wings.

These and other objects and advantages of the invention will become more apparent from the following detailed description taken in conjunction with the accompanying drawings wherein:

FIG. 1 illustrates a part-cross sectional view of an aircraft having a fuselage and wings constructed in accordance with the invention;

FIG. 2 illustrates a cross-sectional view of a wing constructed in accordance with the invention;

FIG. 3 illustrates a view of an aircraft having a parachute deployed and wings separated therefrom in accordance with the invention;

FIG. 4 illustrates a cross-sectional view of an explodable bolt connecting a wing segment to a fuselage segment in accordance with the invention;

FIG. 5 illustrates a partial cross-sectional view of an explodable bolt and rivet connection of a wing to a fuselage in accordance with the invention;

FIG. 6 illustrates a burnable tape segment employed in accordance with the invention;

FIG. 7 illustrates a view taken on line 7—7 of FIG. 6;

FIG. 8 illustrates a helicopter employing a safety system in accordance with the invention.

Figure 9:
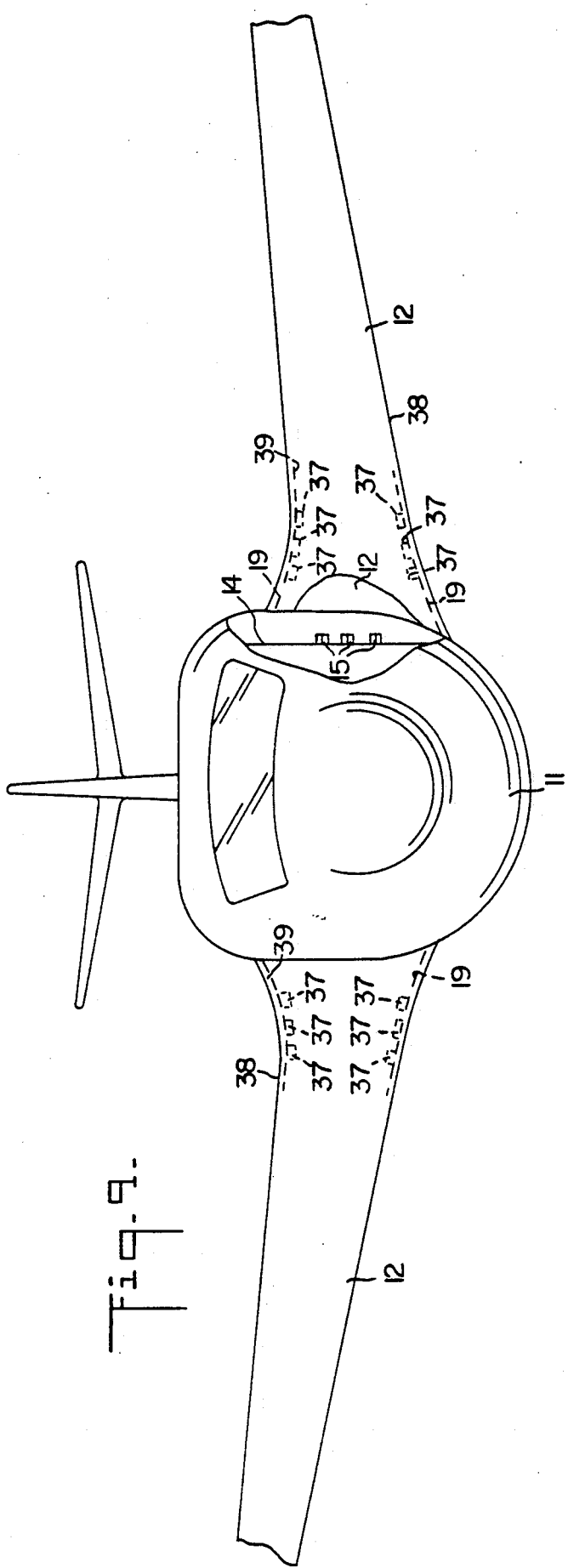
FIG. 9 illustrates a partial cross-sectional view of an explodable bolt and explodable rivet connection of a wing to a fuselage in accordance with the invention.

Referring to FIG. 1, the aircraft 10 has a fuselage 11 and a pair of wings 12 extending from opposite sides of the fuselage 11. In this respect, the aircraft 10 may be constructed of any size and shape and may be of various types. For example the aircraft may be a single passenger aircraft which may be propeller driven or jet engine driven. Also, the aircraft may be of jumbo-jet size and may be driven by multiple engines.

Each wing 12 is connected to the fuselage 11 in any suitable manner as is known. For example, as indicated in FIG. 1, the wings 12 have beams 13 which are connected to a frame 14 of the fuselage 11 by a plurality of bolts 15. In accordance with the invention, the bolts 15 for securing each wing 12 to the fuselage 11 are of the explodable type. In this respect, the bolts 15 are disposed within the connections of each wing 12 to the fuselage 11 so that upon explosion of the bolts 15, the connection between each wing 12 and the fuselage is destroyed thus separating the wings 12 from the fuselage 11.

Referring to FIG. 4, each exploding bolt 15 includes a hollow chamber 16 filled with an explosive fragmenting powder 17 with a lead 18 at the tip of the bolt 15. In addition, a contact wire 19 is attached to the lead 18 to supply an electrical current for activating the fragmenting powder 17. The walls of the hollow chamber and the wall where the lead 18 passes through the tip of the bolt 15 are made of nonconductive material.

As illustrated, the bolt 15 includes a threaded section 20 to receive a nut (not shown). In this respect, the bolt 15, thread 20 and nut are of standard material and size.

Referring to FIGS. 1 and 2, a means 21 is also provided for exploding the bolts 15 in order to disconnect the wings 12 from the fuselage 11. As indicated, the means 21 includes an electronic breadboard 22 mounted in at least one of the wings 12 and a plurality of electrical leads 19 which extend from the breadboard 22 to the respective exploding bolts 15. The breadboard 22 is constructed to electrically activate the bolts 15 upon receiving a suitable command signal. In this regard, a switch is provided in the fuselage 11, for example under the control of the pilot, and is electrically connected to the breadboard 22 for selectively actuating the breadboard 22 to activate the bolts 15.

By way of example, the cockpit of the aircraft may be provided with a pair of switches. In this case, the pilot, when in trouble, would actuate one switch to an "on" position in order to arm the safety system employing the breadboard 22. At this time, light emitting diodes, or the like, may be illuminated on a dashboard of the cockpit to indicate that the system is armed and is in working order. The second switch could then be moved to the "on" position for activation of the safety system. At this time, the breadboard 22 would send suitable signals via the lines 19 to the bolts 1 causing the bolts 15 to explode. With the connection of each wing 12 to the fuselage 11 thus being broken, the wings will be able to separate from the fuselage as indicated in FIG. 3.

Referring to FIG. 2, each wing 12 may be provided with fuel tanks (not shown) with fuel lines 23 extending into the fuselage 11 as is known, as well as various hydraulic lines 24 which extend from controls in the fuselage 11 to elevators, vanes and the like in or on the wing 12. In order to accommodate separation of these lines 23, 24, suitable quick-disconnect means (not shown) are used to connect the lines in the wing 12 to the lines in the fuselage 11. Such quick-disconnect means are well known in the art and need not be further described. In this respect, each disconnect means is operable to separate the fuel lines from each other in response to separation of the respective wing 12 from the aircraft 11.

Where various types of cables extend from the fuselage 11 into the wings 12, cable cutters or other similar quick-disconnect means may be used to cut the cables at suitable points to permit separation of the wings 12.

Referring to FIG. 5, wherein like characters indicate like parts as above, in another embodiment, each wing 12 has an outer skin 25 which may be fastened in overlapping manner to the skin 26 of the fuselage 11 via circumferential rows of rivets 27. In addition, a burnable tape 28 is secured to the inner circumferential periphery of the skin 26 of the fuselage 11 between two rows of rivets 27. In addition, the tape 28 is connected to the breadboard (not shown) for ignition of the tape 28.

As indicated in FIGS. 6 and 7, the tape 28 is a flexible metal tape which includes a longitudinally disposed strip of burnable powder 29, such as magnesium, disposed, for example, within a hollow core or the like of the strip. In addition, a plurality of spark igniters 30 are spaced along and within the strip of powder for ignition of the powder 29. As indicated, each igniter 30 is connected via a suitable line 31 to the breadboard 22 for activation thereby.

When a signal is delivered to the breadboard 22, the spark igniters 30 are activated so as to cause ignition of the magnesium powder 29. To this end, a flash and quick burn will occur at such a high temperature as to burn through the metal skin 26 of the fuselage 11 as well as the skin 25 of a wing 12. Thus, each wing 12 can be severed where the tape 28 is applied so as to separate from the fuselage 11.

Referring to FIG. 3, the aircraft is also provided with one or more compartments (not shown) in which one or more parachutes 32 are disposed in a collapsed condition. In addition, each parachute 32 is connected to the frame of the fuselage 11 and suitable means are provided for deploying the parachute 32 after exploding of the bolts 15 (FIG. 1) or ignition of the tape 28 (FIG. 5) and separation of the wings 12. In this regard, the parachute 32 may be connected in any known manner, for example, as described in U.S. Pat. No. 4,113,208 The controls for deploying the parachutes are also incorporated in the safety system so that upon activation of the safety system, the wings are separated from the fuselage to begin falling away as indicated in FIG. 3 and the parachutes become deployed so as to guide the fuselage to a landing.

Referring to FIG. 8, the use of exploding bolts, and/or burnable tape may also be employed in a helicopter, for example, being located between a rotor hub 33 and a fuselage 34. In such a case, should the pilot activate the safety system, the rotors 35 of the helicopter can be separated from the fuselage 34 while parachutes 36 are deployed from suitable compartments within the helicopter 32. In this respect, the time delay between separation of the rotors 35 and the deployment of the parachutes 36 may be somewhat greater than for a fixed wing aircraft so as to provide time for the rotors 35 to physically separate from the helicopter fuselage 34 a distance sufficient to avoid interference with the deployment of the parachutes 36.

Referring to FIG. 9, wherein like reference characters indicate like parts as above, in addition to using explodable bolts 15 to secure a beam 13 of a wing 12 to the frame 14 of a fuselage 11, a plurality of explodable rivets 37 may secure the outer skin 38 of a wing 12 to the skin 39 of the fuselage 11. In this case, the rivets 37 are connected to the means 21 used to activate the exploding bolts 15 so that the rivets 37 explode simultaneously with the bolts 15.

The invention thus provides a relatively simple safety system for separating wings from a fixed wing aircraft as well as rotors from a helicopter. Further, the safety system may be activated in relatively simple manner without delay. Still further, the invention provides a safety system which provides a rapid response so that the wings of an aircraft can be quickly separated and parachutes quickly deployed.

What is claimed is:

1. An aircraft comprising
a fuselage having a frame and an outer skin;
a pair of wings extending from said fuselage, each said wing having a beam extending from said frame and an outer skin disposed in overlapping relation with said fuselage skin;

a plurality of explodable bolts securing each beam to said fuselage frame;

a plurality of circumferential rows of rivets securing each wing skin to said fuselage skin;

a pair of burnable tapes, each said burnable tape being secured to an inner circumferential periphery of a respective wing skin between two of said rows of rivets and adjacent said fuselage; and means for exploding said bolts and igniting said tapes simultaneously to disconnect said wings from said fuselage.

2. The combination as set forth in claim 1 wherein said means includes an electronic breadboard mounted in at least one wing and electrically connected to said bolts to electrically activate said bolts and a switch in said fuselage electrically connected to said breadboard for selectively actuating said breadboard to activate said bolts.

3. The combination as set forth in claim 1 wherein said tape includes a longitudinally disposed strip of burnable powder and a plurality of spark igniters spaced along and within said strip for ignition of said powder, each igniter being connected to said means for actuation thereby.

4. The combination as set forth in claim 3 wherein said powder is magnesium.

5. The combination as set forth in claim 3 wherein said tape is a metal tape.

6. The combination as set forth in claim 1 which further comprises at least one parachute connected to and disposed in a collapsed condition in said fuselage and means for deploying said parachuted after separation of said wings.

7. An aircraft comprising a fuselage having a frame and an outer skin;

a pair of wings extending from said fuselage, each said wing having a beam extending from said frame and an outer skin disposed in overlapping relation with said fuselage skin;

a plurality of explodable bolts securing each beam to said fuselage frame;

a plurality of explodable rivets securing each wing skin to said fuselage skin; and means for exploding said bolts and said rivets simultaneously to disconnect said wings from said fuselage.

8. An aircraft as set forth in claim 7 wherein said means includes an electronic breadboard mounted in at least one wing and electrically connected to said bolts and said rivets to electrically activate said bolts and said rivets and a switch in said fuselage electrically connected to said breadboard for selectively actuating said breadboard to simultaneously activate said bolts and said rivets.

9. The combination as set forth in claim 7 which further comprises at least one parachute connected to and disposed in a collapsed condition in said fuselage and means for deploying said parachute after severing of said wing.

* * * * *

UNITED STATES PATENT AND TRADEMARK OFFICE
CERTIFICATE OF CORRECTION

PATENT NO. : 5,009,374

DATED : April 23, 1991

INVENTOR(S) : Manfredi, et al.

It is certified that error appears in the above-identified patent and that said Letters Patent is hereby corrected as shown below:

Column 3, line 35 "bolts 1" should be "bolts 15"

Column 6, line 4 "parachuted" should be "parachute".

Signed and Sealed this

Twenty-fourth Day of November, 1992

*Attest:*

DOUGLAS B. COMER

*Attesting Officer*     *Acting Commissioner of Patents and Trademarks*